United States Patent
Brown et al.

(10) Patent No.: US 10,187,355 B2
(45) Date of Patent: Jan. 22, 2019

(54) SYSTEMS AND METHODS FOR ACTIVATING A PRIVATE NETWORK

(71) Applicant: comScore, Inc., Reston, VA (US)

(72) Inventors: Michael A. Brown, Reston, VA (US); Brian Pugh, Reston, VA (US); Michael Rich, Reston, VA (US); Jeffery Kline, Reston, VA (US); Magid M. Abraham, Reston, VA (US)

(73) Assignee: comScore, Inc., Reston, VA (US)

( * ) Notice: Subject to any disclaimer, the term of this patent is extended or adjusted under 35 U.S.C. 154(b) by 157 days.

(21) Appl. No.: 15/277,631

(22) Filed: Sep. 27, 2016

(65) Prior Publication Data

US 2018/0091480 A1  Mar. 29, 2018

(51) Int. Cl.
*H04L 29/06* (2006.01)
*H04W 12/12* (2009.01)
*H04L 29/08* (2006.01)

(52) U.S. Cl.
CPC ...... *H04L 63/0272* (2013.01); *H04L 63/0428* (2013.01); *H04L 63/105* (2013.01); *H04W 12/12* (2013.01); *H04L 67/06* (2013.01); *H04L 67/42* (2013.01)

(58) Field of Classification Search
CPC . H04L 63/0272; H04L 63/0428; H04L 67/06; H04L 67/42; H04W 12/12
See application file for complete search history.

(56) References Cited

U.S. PATENT DOCUMENTS

| | | | | |
|---|---|---|---|---|
| 7,738,457 | B2* | 6/2010 | Nordmark | H04L 45/00 370/392 |
| 8,312,533 | B2* | 11/2012 | Price | G06F 21/85 370/238 |
| 2014/0304505 | A1* | 10/2014 | Dawson | G06F 21/6227 713/165 |
| 2015/0350156 | A1* | 12/2015 | Ma | H04L 43/00 709/245 |
| 2017/0171156 | A1* | 6/2017 | Schultz | H04L 63/0272 |
| 2017/0235618 | A1* | 8/2017 | Lin | G06F 9/543 719/313 |

* cited by examiner

*Primary Examiner* — Mahfuzur Rahman
(74) *Attorney, Agent, or Firm* — Baker & Hostetler LLP (57) ABSTRACT

A copy of a request for content from a content provider is initially received from a client device. The copy of the request indicates a unique identifier of the client device, an originating network address of the client device, and a destination network address of the content provider. The client device is associated with a network provider based on the originating network address. It is determined that the network provider belongs to a predetermined class. Activation of a private network switch is enabled on the client device to provide an encrypted connection between the client device and a private network server before the request is forwarded to the content provider based on the determination that the network provider belongs to the predetermined class.

18 Claims, 4 Drawing Sheets

SYSTEMS AND METHODS FOR ACTIVATING A PRIVATE NETWORK

TECHNICAL FIELD

The present disclosure generally relates to systems and methods for connecting to a private network, and more particularly, to systems and processes for automatically connecting to a virtual private network based on the detection of public network access without human interaction.

BACKGROUND

Connecting a device to a public network provider (e.g., WiFi networks of coffee shops and hotels) creates a viable security threat. The public network connection makes the device vulnerable to third party access of data (e.g., usernames, passwords, and emails) sent through the public network. Indeed, an increasing number of people suffer from identity theft through this third party access of sensitive information.

A number of tools have been developed to enable third party access to devices that connect to public networks. For example, the WiFi Pineapple has the capability of hijacking public network traffic by establishing a rogue access point. The WiFi Pineapple can specifically mask itself as a public network to which the devices attempt to automatically connect. The connection to the rogue access point then enables the WiFi Pineapple to access packets of data sent to and from the devices, and may even allow the WiFi Pineapple to take over the devices.

Currently, there are various mechanisms designed to protect users (e.g., clients of the devices) from such third party access. Virtual private networks (VPNs) have been developed to provide point-to-point encryption from the client device to its destination, avoiding any rogue access points. However, encryption via the VPN connection is often not necessary when connected to a trusted network provider which cannot be masked. And, when a VPN connection may be preferred to protect sensitive data, users may forget to connect to the VPN connection.

Therefore, there is a need to mitigate the problems set forth above and/or other problems in the prior art.

SUMMARY

The foregoing needs are met, to a great extent, by the systems and processes described herein. A copy of a request for content from a content provider is initially received from a client device. The copy of the request indicates a unique identifier of the client device, an originating network address of the client device, and a destination network address of the content provider. The client device is associated with a network provider based on the originating network address. It may be determined that the network provider belongs to a predetermined class. Activation of a private network switch may be enabled on the client device to provide an encrypted connection between the client device and a private network server before the request is forwarded to the content provider based on the determination that the network provider belongs to the predetermined class.

BRIEF DESCRIPTION OF THE DRAWINGS

The same reference numbers are used in the drawings and the following detailed description to refer to the same or similar parts.

DETAILED DESCRIPTION

The present disclosure is generally directed to systems and methods of detecting an unsecured network access and activating a virtual private network. The system may be configured to classify detected network providers based on public access and/or security by aggregating data from a plurality of client devices and/or receiving client input. The system may also be configured to automatically connect the client device to the virtual private network without human interaction, when the system detects a connection to a network provider that is classified in one or more classes, such as an unsecured network.

Figure 1:
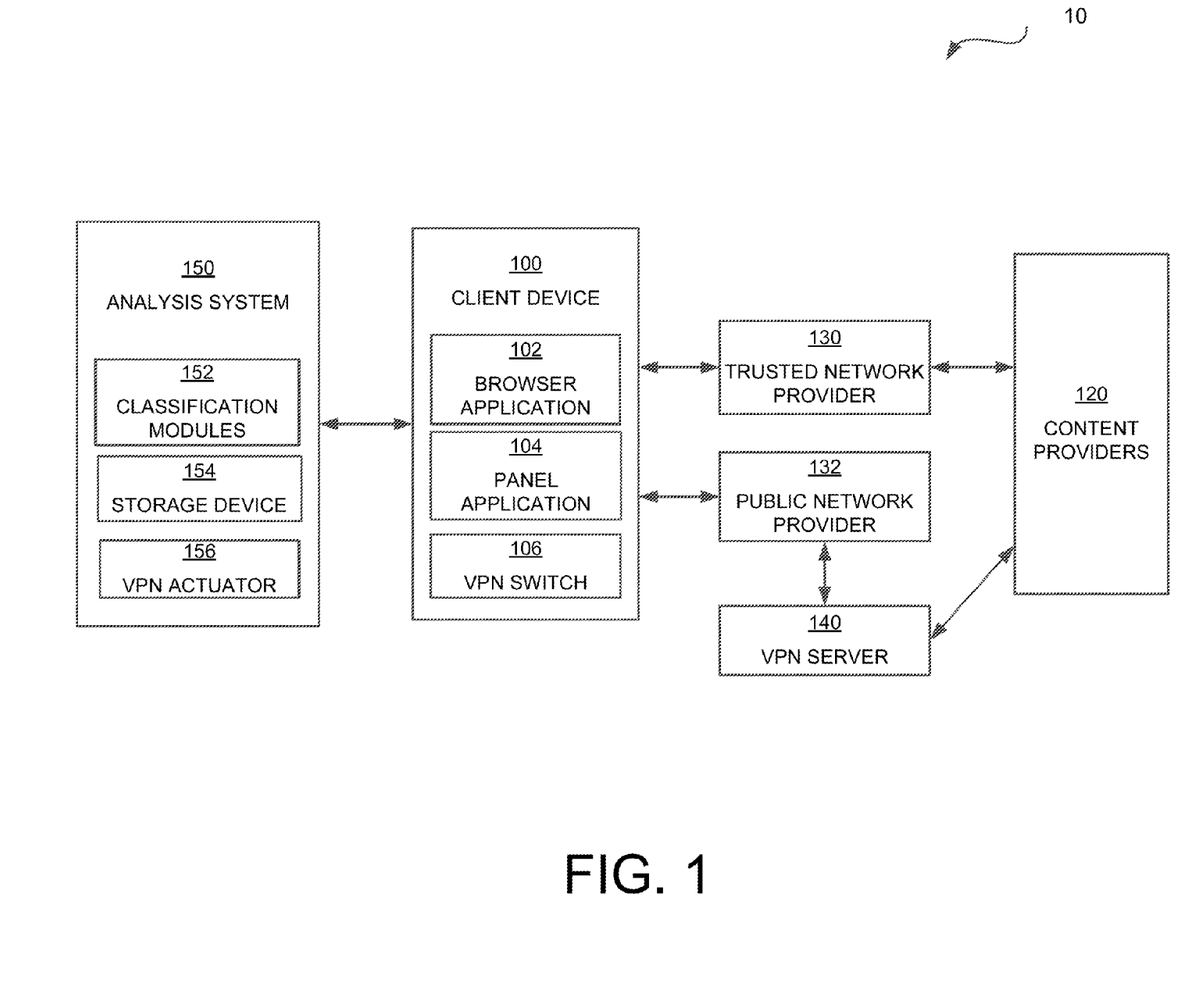
FIG. 1 illustrates an exemplary system that may be used to perform one or more operations of the present disclosure.

FIG. 1 illustrates exemplary hardware and network configurations for various devices that may be used to perform one or more operations of the described aspects. As shown, a network system 10 may include at least one client device 100, one or more content providers 120, and an analysis system 150. Each of client device 100, content providers 120, and analysis system 150 may include at least one processor and one or more storage devices based on any tangible and/or non-transitory storage or memory. Each of client device 100, content providers 120, and analysis system 150 may also include a network interface to communicate via one or more networks providers 130, 132 and/or a virtual private network (VPN) server 140.

Client device 100 may include a personal computing device, such as a desktop, a laptop computer, a mobile device, such as a smartphone or tablet, a kiosk terminal, a Global Positioning System (GPS) device, and/or other devices. Client device 100 may be loaded with an operating system and a browser application 102 configured to render webpages or other web or application content from content provider 120. Accordingly, browser application 102 may be configured to access client-side code (e.g., HyperText Markup Language (HTML) code) from content provider 120 that provides instructions to render a desired webpage. Exemplary operating systems include Microsoft Windows, Apple OS X, Linux, iOS, and Android, and exemplary web browsers include Internet Explorer, Google Chrome, Mozilla Firefox, and Safari. Each of client devices 100 may be provided a unique identifier.

Content providers 120 may include one or more of websites or app servers maintained by an entity. In some embodiments, some content providers 120 may require encrypted data, such as financial institutions (e.g., Wells Fargo. Vanguard), messaging providers (e.g., AIM, Microsoft Lync), email providers (e.g., Gmail, Yahoo), social network providers (e.g., Facebook, Twitter), and/or streaming service providers (e.g., Netflix). For example, the encrypted data of those content providers 120 may be required to protect sensitive information, such as usernames, passwords, and/or credit card information. Some content providers 120 may not require encrypted data, such as news providers (e.g., Washington Post, ESPN). Content providers 120 may load and update websites and/or apps that may be accessed by client device 100. For example, content providers 120 may allow a client to access information and/or transmit data, such as access bank statements, transfer goods, services, and/or money, send private messages (e.g., email), and/or post information to the public.

Client device 100 may be configured to communicate with content providers 120 through trusted network provider 130 and/or public network provider 132. Network providers 130, 132 may comprise any type of computer networking arrangement used to exchange data through a wired and/or wireless connection. For example, network providers 130, 132 may provide a connection to the Internet, a private data network, and/or other suitable connection(s) that enables network system 10 to send and receive information between the components of network system 10. For example, network providers 130, 132 may embody network routers generating a wireless local area network (e.g., WiFi) enabling connection of client device 100 to the Internet.

Trusted network provider 130 may include a network provider, such as a home or work network, which may be secured by a protected router with limited access. For example, trusted network provider 130 may be a private home or work network that is password protected. The security of trusted network provider 130 may limit the exposure of the client from third-parties undesirably accessing information from client device 100.

Public network provider 132 may include a network of an establishment providing public access and/or a network that is generally unsecured. Exemplary establishments include coffee shops, restaurants, libraries, grocery stores, markets, and/or hotels. In some embodiments, public network provider 132 may be password protected, but may potentially be unsecured because of the number of devices allowed to access the network over time and/or simultaneously. For example, the public access of public network provider 132 may allow third parties to access data from client device 100 sent to the router, potentially compromising sensitive data. If the connection to public network provider 132 is compromised, the third parties may gain access to usernames, passwords, unencrypted internet messages, bank account numbers, and/or credit card information.

Analysis system 150 may be configured to classify a detected network as either a trusted network or a public network. In some embodiments, client device 100 may receive input from the client to classify the detected network as a trusted network or a public network. For example, the input may be received from a prompt to the client when the network is initially detected. The prompt may be in the form of a pop-up after an initial detection of the network directing the client to classify the detected network. This data may be aggregated from a plurality of client devices 100. For example, networks may be classified through data aggregation and analysis performed by analysis system 150, as discussed further below. In some embodiments, analysis system 150 may classify a detected network based on the number and/or frequency of requests for data received from the detected network over time. In some embodiments, the analysis system 150 may, additionally or alternatively, classify the detected network based on the number and/or frequency of client devices simultaneously on the detected network. For example, if more than a predetermined number of client devices are simultaneously on the detected network, the detected network may be classified as a public network.

Client device 100 may also be in communication with VPN server 140. VPN server 140 may enable a virtual point-to-point connection (e.g., a VPN connection) between client device 100 and content provider 120, for example, through the use of dedicated connections, virtual tunneling protocols, and/or traffic encryption. In some embodiments, VPN server 140 may provide symmetric-key encryption and/or public-key encryption providing a virtual private network between client device 100 and content provider 120. The virtual private network may enable passage of packets of data from client device 100 to content provider 120 without being accessed by third party devices. Communication through VPN server 140 may be enabled through actuation of a VPN switch 106 on client device 100. VPN switch 106 may be actuated manually by the client and/or remotely by analysis system 150 without human interaction.

Analysis system 150 may send to and receive data from client device 100 to control the network connection. The connection between the analysis system 150 and client device 100 may be encrypted. Analysis system 150 may include one or more classification modules 152, a storage device 154, and a VPN actuator 156, configured to send and receive information between each other. In the example shown in FIG. 1, there is a single analysis system 150. However, in other implementations, there may be more than one analysis system 150. For example, each client device 100 may send data to more than one analysis system 150 for redundancy. In other implementations, each client device 100 may send data to different analysis systems 150. In this implementation, the data may be communicated to and aggregated at a central server for later processing. Analysis system 150 may communicate with client device 100 through installation of a panel application 104 installed on client device 100. Panel application 104 may be installed on a plurality of client devices 100 to enable data collection by analysis system 150 to characterize detected networks providers. Panel application 104 may also enable analysis system 150 to manipulate VPN switch 106 of client device 100.

Figure 2:
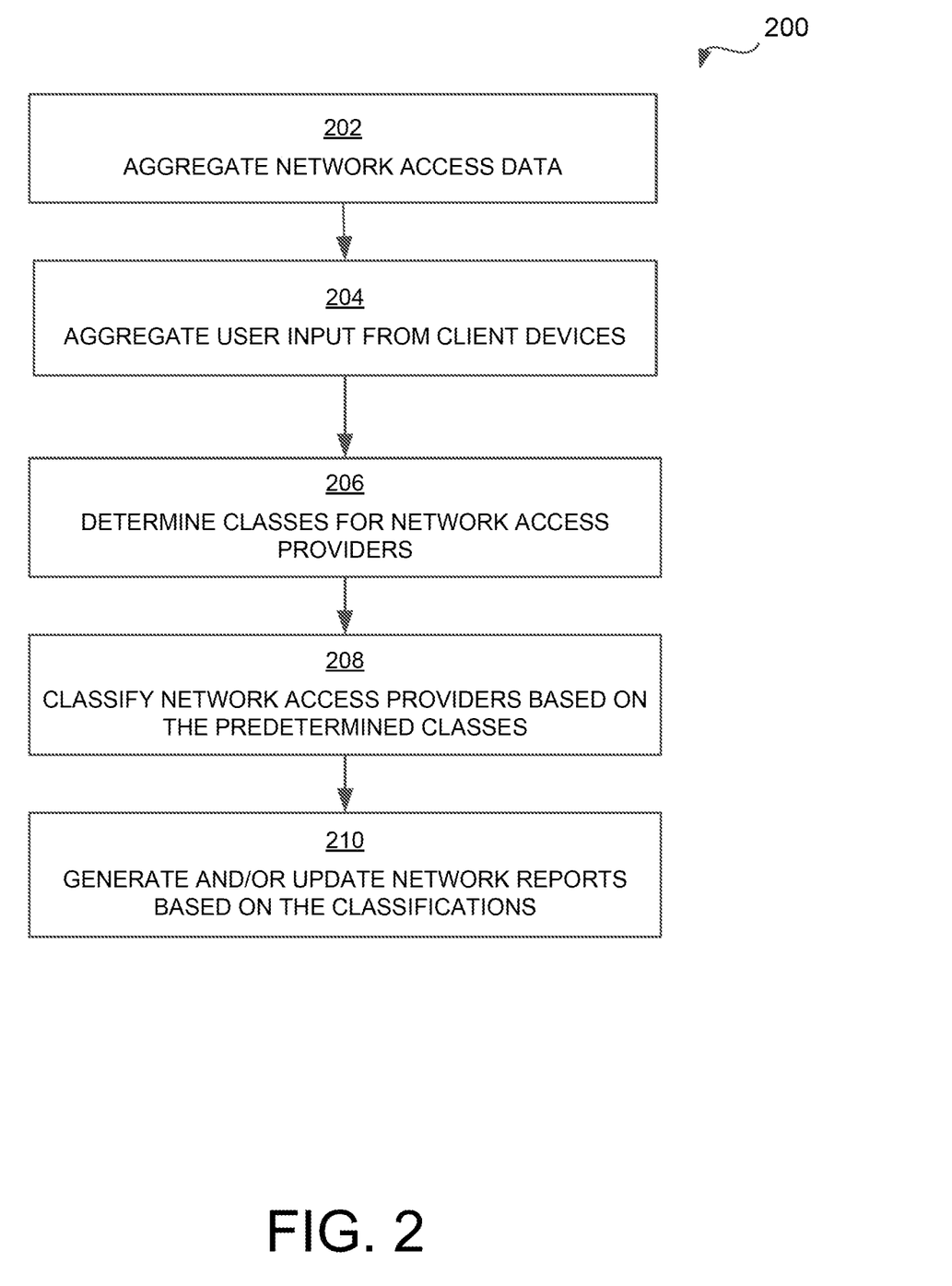
FIG. 2 illustrates an exemplary flow chart of a method for characterizing detected networks that may be performed by the exemplary system of FIG. 1.

FIG. 2 illustrates an exemplary embodiment of a method 200 for characterizing (e.g., classifying) detected networks based on public access and/or security. Even though the method 200 is discussed as being performed by analysis system 150, one or more steps of method 200 may be performed, in conjunction or alternatively, by client device 100, content provider 120, trusted network provider 130, and/or public network provider 132. Generally, method 200 aggregates network data in storage device 154, and analyzes the data with classification module 152. For example, method 200 may determine whether a detected network is either a trusted network provider 130 or a public network provider 132 based on analyzing the aggregated data according to one or more factors. The network data may be aggregated from a large number of client devices 100 through panel application 104 and compiled into network reports. The network reports may enable recognition of a network as either a trusted network provider 130 or a public network provider 132 after initial detection and/or connection by client device 100 without human input.

In step 202, analysis system 150 may aggregate network access data, Analysis system 150 may monitor network traffic to analyze and collect information regarding requests for data sent from client device 100 and subsequent responses. In some embodiments, analysis system 150 may monitor network providers 130, 132 to quantify frequency of access and/or unique clients, while in other embodiments, analysis network 150 may receive communications from multiple client devices 100. For example, a large number of unique client devices 100 accessing the same network provider may be indicative of a public network.

Analysis system 150 may determine the day/time of access. For example, frequent access of the network provider 130, 132 between 9 am-5 pm on the weekday and/or on the weekend may indicate that the network is a public network. Analysis system 150 may also detect the configuration of the network provider 130, 132. Analysis system 150 may determine if network provider 130, 132 is password protected, which may suggest a trusted network provider 130. Analysis system 150 may also examine the name of the network to determine if characters in the name are recognized (e.g., STARBUCKS_WIFI). In some embodiments, analysis system 150 may perform a reverse look-up to determine the host of the network provider 130, 132 based on a network identifier (e.g., an IP address). For example, analysis system 150 may determine whether the detected network provider 130, 132 is residential or public. If the host of network provider 130, 132 is a public establishment (e.g., Starbucks), analysis system 150 may consider the detected network to be a public network.

In an optional step 204, analysis system 150 may aggregate client input from one or more client devices 100. For example, once a network is detected, client device 100 may prompt the client to input whether the detected network is either a trusted network provider 130 or a public network provider 132. Additionally or alternatively, client device 100 may prompt the client to provide whether the detected network is a home network of the client, a work network of the client, a home network of another individual, and so forth. The client input of a trusted network provider 130 or a public network provider 132 may not be the same for all client devices 100. For example, a client may misidentify a password protected coffee shop network to be a trusted network provider 130, However, analysis system 150 may factor in the aggregated client input to correctly make determinations contrary to the client input, such as indicating that a network is a public network provider 132 even after contrary client input is received. In some embodiments, the determinations may be client-specific. For example, the determination that a network is a home network may classify it as a trusted network provider 130 for some client devices 100 and a public network provider 132 for other client devices 100.

In step 206, analysis system 150 may determine classes for network providers based on one or more of the groups of data aggregated in steps 202, 204. Analysis system 150 may determine classes, such as trusted networks and public networks. In some embodiments, the classes may further include subclasses, such as password protected home networks, home networks without password protection, office networks, password protected coffee shop networks, and/or coffee shop networks without password protection. Additional subclasses may, additionally or alternatively, be based on the number of unique clients on the network. For example, the security of the network may be quantified by having less than 10 unique client devices, 10-20 unique client devices, 20-100 unique client devices, or greater than 100 unique client devices over a predetermined period of time. Fax instance, a public network may be determined as having greater than 10 unique client devices over a 24 hour period.

In step 208, analysis system 150 may classify network providers based on the predetermined classes of step 206. Each of the detected network providers may be assigned a unique identifier and assigned to one or more of the classes as discussed above. For example, a network determined to be associated with a Starbuck's coffee shop and/or have greater than a predetermined number of unique client devices over a predetermined time period may be classified as a public network. On the other hand, a network indicated to be a home network, password protected, and/or having less than a predetermined number of unique client devices may be classified as a trusted network.

In step 210, analysis system 150 may generate and/or update network reports based on the classifications. Some reports may be individual to the specific client device 100. For example, in some instances, a residential network may be considered a trusted network for the residents, but may be considered a public network provider 132 for other client devices 100. Some reports may apply to all client devices 100. For example, a coffee shop network may be indicated to be a public network for all client devices 100.

Figure 3:
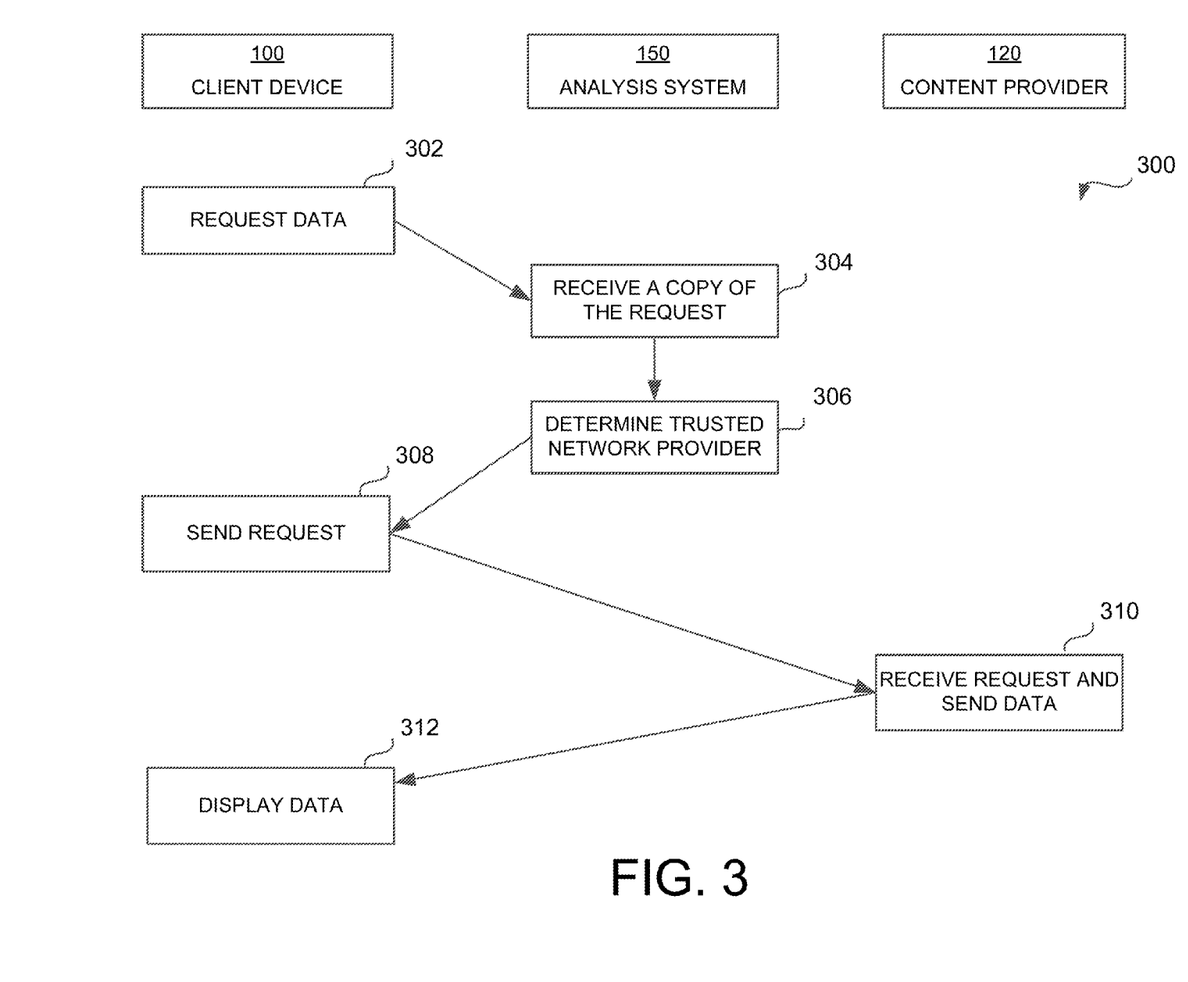
FIG. 3 illustrates an exemplary flow chart of a method for connecting to a trusted network that may be performed by the exemplary system of FIG. 1.

FIG. 3 illustrates an exemplary embodiment of a method 300 of accessing trusted network provider 130. Even though discussed as being performed by analysis system 150, one or more steps of method 300 may be performed, in conjunction or alternatively, by client device 100, content provider 120, trusted network provider 130, and/or public network provider 132. Generally, method 300 may not manipulate VPN switch 106 based on a determination of communication between the client device and trusted network provider 130.

In step 302, client device 100 may request data from content provider 120. The data may be in a number of different forms. The data request may include the client requesting a webpage from a variety of different types of domain. The data request may also include the client requesting an application to be displayed, such as an application displayed on a mobile device. In some embodiments, the data request may not be initiated by the client, e.g., user. For example, the data request may include an application updating or downloading data in the background.

In step 304, analysis system 150 may receive a copy of the request for the data from client device 100. The copy may indicate a unique identifier of client device 100, an originating network address of client device 100, a destination of content provider 120, and/or details of requested data. Analysis system 150 may receive the copy of the request prior to the request being forwarded to content provider 120. For example, the network address of client device 100 may include an IP address or any other network identifier, identifying the associated network provider. In some embodiments, step 304 may be performed immediately after connection to the network provider.

In step 306, analysis system 150 may determine if the network provider indicated by the copy of the request is within a predetermined class. For example, analysis system 150 may be configured to determine if the indicated network provider is a trusted network provider 130. Step 306 may be performed by looking up the network identifier obtained in step 304 within network reports generated by method 200. For example, analysis system 150 may determine that the detected network is a trusted home network. In some embodiments, analysis system 150 may, additionally or alternatively, determine that the detected network is a misted network based on client input of client device 100. Based on the determination of a trusted network, analysis system 150 may proceed to steps 308-312 where client device 100 downloads the requested data through trusted network provider 130 without manipulating a VPN switch on client device 100.

In step 308, analysis system 150 may enable client device 100 to send a request for the webpage to content provider 120 via trusted network provider 130. In step 310, content provider 120 may receive the request for the data and send the data to client device 100. In step 312, client device 100 may display the requested data to the client.

Figure 4:
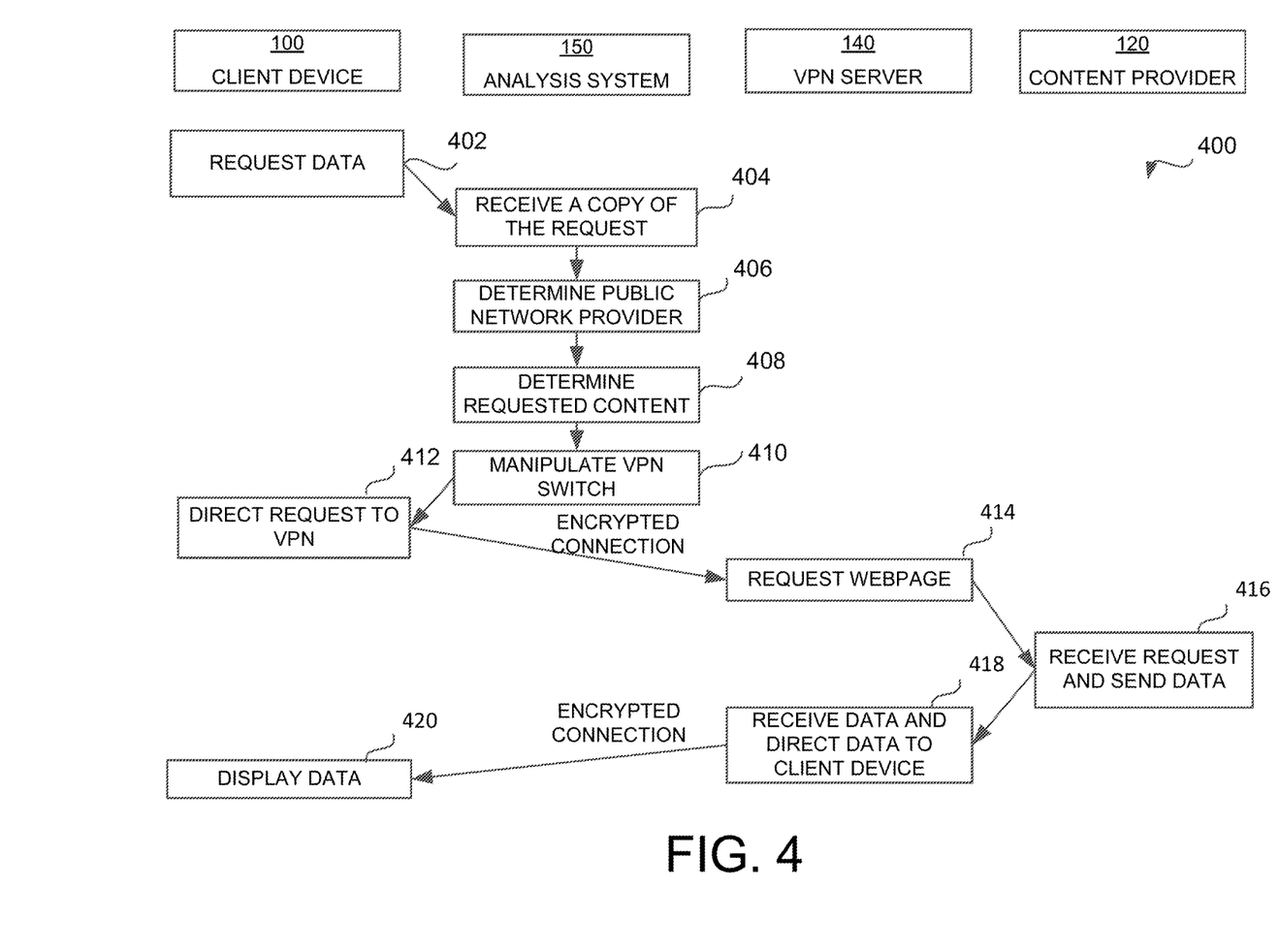
FIG. 4 illustrates an exemplary flow chart of a method for providing a virtual private connection that may be performed by the exemplary system of FIG. 1.

FIG. 4 illustrates an exemplary embodiment of a method 400 for providing a virtual private connection based on detection of a public network. Even though discussed as being performed by analysis system 150, one or more steps of method 400 may be performed, in conjunction or alternatively, by client device 100, content provider 120, trusted network provider 130, and/or public network provider 132. Generally, method 400 may enable a connection to VPN server 140, based on a determination of access to public network provider 132, The determination of public network provider 132 may be based on the network reports of method 200 and/or client input from client device 100. In some embodiments, the connection to VPN server 140 may be additionally based on a determination of sensitive data content being transmitted.

In step 402, a client may request a webpage through client device 100. In step 404, analysis system 150 may receive a copy of the request for the data from client device 100. Steps 402 and 404 may be performed similar to steps 302 and 304. For example, the copy of the request may indicate a unique identifier of the client device 100, an originating network address of the client device 100, and/or a destination network address of content provider 120.

In step 406, analysis system 150 may determine that the network access is provided by public network provider 132, Step 406 may be performed similar to step 306, but in step 406 a connection to public network provider 132 is determined. As discussed above, step 406 may be performed by comparing the network identifier acquired in step 404 to the network reports generated in method 200. Step 406 may, additionally or alternatively, be performed by a prompt displayed on client device 100 to the client.

In step 408, analysis system 150 may determine the nature of the requested webpage. In some embodiments, analysis system 150 may manipulate VPN switch 106 on the client device 100 based on the domain and/or content of the request by client device 100. For example, analysis system 150 may classify and recognize destinations based on sensitivity of data. Analysis system 150 may recognize domain names and prevent third party access of data pertaining to those domain names. For example, analysis system 150 may access a look-up table providing one or more predetermined categories of content providers 120 that require encrypted data, such as at least one of financial institutions, messaging providers, email providers, social network providers, and/or streaming service providers. Analysis system 150 may also parse the content requested to determine, for example, if a password is required or sensitive information is involved. In some embodiments, step 408 may be omitted, such that the VPN connection is enabled whenever public network is determined.

In step 410, analysis system 150 may manipulate VPN switch 106. For example, based on a determination that client device 100 is connected to public network provider 132, analysis system 150 may utilize VPN actuator 156 to electronically manipulate or activate VPN switch 106 on client device 100 to enable a VPN connection. In some embodiments, the manipulation of VPN switch 106 may be further based on the domain and/or content of the request, as determined in step 408. For example, analysis network may analyze the parsed content and/or compare the detected domain to one or more predetermined categories (e.g., financial institutions), and manipulate VPN switch 106 further based on the content and/or domain. The predetermined categories may be based on content providers 120 requiring encrypted data. In some embodiments, the VPN connection may be enabled before the request is forwarded to content provider 120, substantially avoiding transmission of the request and/or subsequent requests via public network provider 132.

Steps 412-418 provide exemplary VPN protocols according to the present disclosure. In step 412, client device 100 may encrypt the request and direct the encrypted request to VPN server 140. In step 414, analysis system 150 may direct an encrypted request to the webpage. In step 416, analysis system 150 may receive the encrypted request and send data for the webpage. In step 418, analysis system 150 may receive encrypted data and direct the encrypted data client device 100. In step 420, client device 100 may display the requested webpage on client device 100. Although encryption is discussed in steps 412-418, it is contemplated that any VPN protocol may be used, such as Point-to-Point Tunneling Protocol (PPTP), OpenVPN, Layer 2 Tunneling Protocol), and/or IPsec.

The various methods describes above can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A computer-implemented method, comprising:
receiving, from a client device, a copy of a request for content from a content provider, wherein the copy of the request indicates a unique identifier of the client device, an originating network address of the client device, and a destination network address of the content provider, wherein the client device and the content provider are different;
associating the client device with a network provider based on the originating network address;
determining that the network provider belongs to a predetermined class associated with an unsecured public network provider; and
enabling, based on the determination that the network provider belongs to the predetermined class associated with the unsecured public network provider, activation of a private network switch on the client device to provide an encrypted connection between the client device and a private network server before the request is forwarded to the content provider.

2. The method of claim 1, wherein the determining that the network provider belongs to the predetermined class associated with the unsecured public network provider includes comparing the originating network address to a predetermined report identifying unsecured public network providers.

3. The method of claim 2, further comprising creating the predetermined report that identifies unsecured public network providers based on at least one of client input, a reverse lookup of the network provider, and a number of unique clients of the network provider.

4. The method of claim 1, further comprising:
receiving, from a second client device, a copy of a second request for content from the content provider, wherein the copy of the second request indicates a second unique identifier of the second client device, a second originating network address of the second client device, and the destination network address of the content provider;
associating the second client device with a second network provider based on the second originating network address;
determining that the second network provider belongs to a second predetermined class that is not associated with the unsecured public network provider; and
not accessing, based on the determination that the second network provider belongs to the second predetermined class that is not associated with the unsecured public network provider, a private network switch on the second client device.

5. The method of claim 4, wherein the second predetermined class of the second network provider is a trusted network provider.

6. The method of claim 1, further comprising:
determining that the content provider belongs to a predetermined category of content providers; and
enabling activation of the private network switch on the client device to provide an encrypted connection between the client device and a private network server before the request is forwarded to the content provider based on the determination that the network provider belongs to the predetermined class associated with the unsecured public network provider and that the content provider belongs to the predetermined category of content providers.

7. The method of claim 6, wherein the predetermined category of content providers includes at least one content provider that requires encrypted communications.

8. The method of claim 7, wherein the predetermined category of content providers that require encrypted communications includes at least one of a financial institution, a messaging provider, an email provider, a social network provider, and streaming service providers.

9. The method of claim 2, further comprising creating the predetermined report that identifies unsecured public network providers based on at least one of client input, a reverse lookup of the network provider, and a number of unique clients of the network provider.

10. A computer-implemented method, comprising:
creating a predetermined report that identifies network providers of a predetermined class based on at least one of client input, a reverse lookup of network provider, and a number of unique clients of each network provider;
receiving, from a client device, a copy of a request for content from a content provider, wherein the copy of the request indicates a unique identifier of the client device, an originating network address of the client device, and a destination network address of the content provider, wherein the client device and the content provider are different;
associating the client device with a network provider based on the originating network address;
determining that the network provider belongs to the predetermined class by comparing the originating network address to the predetermined report identifying the network providers of the predetermined class; and
enabling, based on the determination that the network provider belongs to the predetermined class, activation of a private network switch on the client device to provide an encrypted connection between the client device and a private network server before the request is forwarded to the content provider.

11. The method of claim 10, further comprising:
receiving, from a second client device, a copy of a second request for content from the content provider, wherein the copy of the second request indicates a second unique identifier of the second client device, a second originating network address of the second client device, and the destination network address of the content provider;
associating the second client device with a second network provider based on the second originating network address;
determining that the second network provider belongs to a second predetermined class that is different from the predetermined class; and
not accessing, based on the determination that the second network provider belongs to the second predetermined class, a private network switch on the second client device.

12. The method of claim 10, further comprising:
determining that the content provider belongs to a predetermined category of content providers; and
enabling activation of the private network switch on the client device to provide an encrypted connection between the client device and a private network server before the request is forwarded to the content provider based on the determination that the network provider belongs to the predetermined class and that the content provider belongs to the predetermined category of content providers.

13. The method of claim 12, wherein the predetermined category of content providers that require encrypted communications includes at least one content provider that requires encrypted communications.

14. A computer-implemented method, comprising:
receiving, from a client device, a copy of a request for content from a content provider, wherein the copy of the request indicates a unique identifier of the client device, an originating network address of the client device, and a destination network address of the content provider, wherein the client device and the content provider are different;
associating the client device with a network provider based on the originating network address;
determining that the network provider belongs to a predetermined class;
determining that the content provider belongs to a predetermined category of content providers that require encrypted communications; and
enabling, based on the determination that the network provider belongs to the predetermined class and that the content provider belongs to the predetermined category of content providers that require encrypted communications, activation of a private network switch on the client device to provide an encrypted connection between the client device and a private network server before the request is forwarded to the content provider.

15. The method of claim 14, wherein the predetermined category of content providers that require encrypted communications includes at least one of a financial institution, a messaging provider, an email provider, a social network provider, and streaming service providers.

16. The method of claim 14, further comprising:
receiving, from a second client device, a copy of a second request for content from the content provider, wherein the copy of the second request indicates a second unique identifier of the second client device, a second originating network address of the second client device, and the destination network address of the content provider;
associating the second client device with a second network provider based on the second originating network address;
determining that the second network provider belongs to a second predetermined class that is different from the predetermined class; and
not accessing, based on the determination that the second network provider belongs to the second predetermined class, a private network switch on the second client device.

17. A computer-implemented method, comprising:
receiving, from a client device, a copy of a request for content from a content provider, wherein the copy of the request indicates a unique identifier of the client device, an originating network address of the client device, and a destination network address of the content provider, wherein the client device and the content provider are different;
associating the client device with a network provider based on the originating network address;
determining that the network provider is an unsecured public network provider;
enabling, based on the determination that the network provider is an unsecured public network provider, activation of a private network switch on the client device to provide an encrypted connection between the client device and a private network server before the request is forwarded to the content provider;
receiving, from a second client device, a copy of a second request for content from the content provider, wherein the copy of the second request indicates a second unique identifier of the second client device, a second originating network address of the second client device, and the destination network address of the content provider;
associating the second client device with a second network provider based on the second originating network address;
determining that the second network provider is a trusted network provider; and
not accessing, based on the determination that the second network provider is a trusted network provider, a private network switch on the second client device.

18. The method of claim 17, wherein the determining that the network provider is an unsecured public network provider includes comparing the originating network address to a predetermined report identifying unsecured public network providers.

\* \* \* \* \*